(12) United States Patent
Miller et al.

(10) Patent No.: US 7,608,292 B2
(45) Date of Patent: Oct. 27, 2009

(54) METHOD OF PROCESSING SOY PROTEIN

(75) Inventors: Bill L. Miller, Fort Dodge, IA (US); Madhu Kakade, Roseville, MN (US)

(73) Assignee: Land O'Lakes Purina Feed LLC, Shoreview, MN (US)

( * ) Notice: Subject to any disclaimer, the term of this patent is extended or adjusted under 35 U.S.C. 154(b) by 622 days.

(21) Appl. No.: 10/684,748

(22) Filed: Oct. 14, 2003

(65) Prior Publication Data

US 2005/0079271 A1 Apr. 14, 2005

(51) Int. Cl.
*A23J 1/00* (2006.01)
(52) U.S. Cl. .................... 426/656; 426/634; 426/635
(58) Field of Classification Search ............... 426/656, 426/634, 635
See application file for complete search history.

(56) References Cited

U.S. PATENT DOCUMENTS

| | | | |
|---|---|---|---|
| 2,451,659 A * | 10/1948 | Calvert .................. 530/378 |
| 3,396,033 A * | 8/1968 | Ferrara et al. .............. 426/622 |
| 3,475,404 A * | 10/1969 | Burnett et al. ............. 530/356 |
| 3,498,794 A * | 3/1970 | Calvert et al. .............. 426/656 |
| 3,607,860 A | 9/1971 | Yamato et al. |
| 3,615,680 A | 10/1971 | Henika et al. |
| 3,615,715 A | 10/1971 | Mullen |
| 3,630,753 A * | 12/1971 | Melnychyn et al. ......... 530/378 |
| 3,635,726 A | 1/1972 | Sair |
| 3,738,913 A * | 6/1973 | Johnsen et al ............. 435/68.1 |
| 3,762,931 A | 10/1973 | Craig et al. |
| 3,794,731 A | 2/1974 | Dannert et al. |
| 3,794,735 A | 2/1974 | Newsom et al. |
| 3,843,802 A | 10/1974 | Puski |
| 3,870,812 A | 3/1975 | Hayes, Jr. et al. |
| 3,885,052 A | 5/1975 | Starr |
| 3,901,978 A | 8/1975 | Nelson et al. |
| 3,966,702 A | 6/1976 | Carey |
| 3,993,636 A | 11/1976 | Maubois et al. |
| 4,031,267 A | 6/1977 | Berry et al. |
| 4,049,840 A | 9/1977 | Reesman et al. |
| 4,054,679 A | 10/1977 | Melcer et al. |
| 4,079,155 A | 3/1978 | Kakade |
| 4,085,229 A | 4/1978 | Staron |
| 4,131,607 A | 12/1978 | Petit et al. |
| 4,132,808 A | 1/1979 | Kakade |
| 4,174,313 A | 11/1979 | Petit et al. |
| 4,186,218 A | 1/1980 | Gomi et al. |
| 4,188,399 A | 2/1980 | Shemer |
| 4,214,010 A | 7/1980 | Corbett |
| 4,216,240 A | 8/1980 | Shirai et al. |
| 4,238,515 A | 12/1980 | Shemer |
| 4,338,340 A | 7/1982 | Morimoto et al. |
| 4,346,122 A | 8/1982 | Orthoefer et al. |
| 4,349,576 A | 9/1982 | Lehnhardt et al. |
| 4,349,578 A * | 9/1982 | Wright et al. ............... 426/630 |
| 4,361,588 A | 11/1982 | Herz et al. |
| 4,402,874 A | 9/1983 | Johnson et al. |
| 4,409,248 A | 10/1983 | Lehnhardt et al. |
| 4,410,554 A | 10/1983 | Saller |
| 4,435,438 A | 3/1984 | Lehnhardt et al. |
| 4,450,176 A | 5/1984 | Stahel et al. |
| 4,474,694 A | 10/1984 | Coco et al. |
| 4,543,264 A | 9/1985 | Stahel |
| 4,551,274 A | 11/1985 | Shen |
| 4,642,236 A | 2/1987 | Friend et al. |
| 4,771,126 A | 9/1988 | Hirotsuka et al. |
| 4,889,921 A | 12/1989 | Diosady et al. |
| 4,956,190 A | 9/1990 | Chawan et al. |
| 4,957,748 A | 9/1990 | Winowiski et al. |
| 4,976,982 A | 12/1990 | Gillmore et al. |
| 5,006,349 A | 4/1991 | Dahlstrom et al. |
| 5,023,091 A | 6/1991 | Winowiski |
| 5,063,072 A | 11/1991 | Gillmore et al. |
| 5,064,665 A | 11/1991 | Klopfenstein et al. |
| 5,082,672 A | 1/1992 | Hamada et al. |
| 5,100,679 A | 3/1992 | Deirue |
| 5,138,038 A | 8/1992 | Katayama et al. |
| 5,366,661 A | 11/1994 | Katayama et al. |
| 5,523,293 A | 6/1996 | Jane et al. |
| 5,597,607 A | 1/1997 | Samoto et al. |
| 5,610,277 A | 3/1997 | Bassi et al. |
| 5,665,152 A | 9/1997 | Bassi et al. |
| 5,766,331 A | 6/1998 | Krinski et al. |
| 5,874,102 A | 2/1999 | LaJoie et al. |
| 5,977,312 A | 11/1999 | Bassi et al. |
| 6,113,974 A | 9/2000 | Winowiski et al. |
| 6,221,380 B1 | 4/2001 | Woodroofe et al. |
| 6,242,013 B1 | 6/2001 | Luhman et al. |
| 6,291,559 B1 | 9/2001 | Krinski et al. |
| 6,355,291 B1 | 3/2002 | Rose et al. |
| 6,426,112 B1 | 7/2002 | Boatright |
| 6,465,031 B1 | 10/2002 | Bush et al. |
| 2003/0060607 A1 | 3/2003 | Diosady et al. |

FOREIGN PATENT DOCUMENTS

| | | | |
|---|---|---|---|
| JP | 55-88662 | * | 7/1980 |
| JP | 63044848 | * | 2/1988 |
| WO | WO 95/04467 | * | 2/1995 |

* cited by examiner

*Primary Examiner*—Anthony Weier
(74) *Attorney, Agent, or Firm*—Westman, Champlin & Kelly, P.A.; Z. Peter Sawicki

(57) ABSTRACT

A method of processing a proteinaceous material, the method entails (1) blending the proteinaceous material with alcohol and a reducing agent and (2) maintaining a combination having the proteinaceous material and the reducing agent at a greater than ambient temperature for a holding period of at least about five minutes to form a proteinaceous product.

33 Claims, No Drawings

METHOD OF PROCESSING SOY PROTEIN

CROSS-REFERENCE TO RELATED APPLICATION(S): None.

BACKGROUND OF THE INVENTION

The present invention generally relates to a method of processing vegetable protein to enhance the solubility and color characteristics of the vegetable protein while also reducing the antigenicity of the vegetable protein. More particularly, the present invention relates to a method of chemically treating vegetable protein, such as full fat, low fat, or defatted native soy proteins, to enhance the solubility and color characteristics of the vegetable protein while also reducing the antigenicity of the vegetable protein.

Over the years, researchers have learned soybeans may be processed to recover or extract a number of valuable components, such as soy protein and soybean oil, from the soybeans. Also, soybeans may be processed to form soy flours, soy flakes, and soy meal that are high in nutritionally beneficial substances, such as fiber and protein. Consequently, many soy products are commonly used for production of animal feeds and food products for human consumption.

However, soy products that contain soy protein, prior to appropriate processing, generally have off-flavors that are unpalatable to animals and humans alike. Also, soy products that contain soy protein, prior to appropriate processing, generally contain antigenic substances. Destruction of antigenic substances naturally present in soy products beneficially enhances the digestibility and nutritional benefits of soybean products.

Minimizing both off-flavors and antigenic substances is desirable to increase the value of soy products that contain soy protein. Processing techniques that employ organic solvents are available that beneficially reduce off-flavors present in soy products that contain soy protein. Likewise, processing techniques that employ heat treatment are available that beneficially reduce off-flavors present in soy products that contain soy protein. However, such heat treatment processes do little, if anything, to reduce the antigenicity of the heat-processed soybean products.

Furthermore, such organic solvent-based processing techniques and heat treatment processes typically denature a substantial amount of the soy protein and undesirably yield soybean products with low solubility in water, such as a Protein Dispersability Index on the order of about 7, or even less. The Protein Dispersability Index (subsequently referred to as "PDI") is a measure of protein solubility (and consequently a measure of protein dispersability) in water. PDI decreases as the degree of protein denaturation increases, absent other processing to enhance the solubility of the denatured protein. Enhanced solubility and dispersability of denatured proteins is important to support production of animal feeds, food products, and beverages that contain proteins derived from vegetable sources, such as soybeans. Another concern is that some existing organic solvent-based processing techniques have a discoloration effect that yields soybean products with off-colors. Off-colors in soybean products, as compared to lighter and whiter colored soybean products, tend to reduce the visual appeal of the soybean products.

The food and animal feed manufacturing industries are in need of a new soybean processing technique that, compared to existing techniques, enhances the dispersability of soy protein products in water, while reducing discoloration in the soy protein products. Desirably, the new soybean processing technique will also continue to minimize off-flavors in the soy protein products, while maximizing destruction of antigenic substances. The process of the present invention provides a beneficial solution to these needs by yielding a product exhibiting enhanced solubility, reduced discoloration, minimized off flavors, and minimized antigenic protein content.

BRIEF SUMMARY OF THE INVENTION

The present invention includes a method of processing a proteinaceous material. The method entails (1) blending the proteinaceous material with alcohol and a reducing agent and (2) maintaining a combination comprising the proteinaceous material and the reducing agent at a greater than ambient temperature for a holding period of at least about five minutes to form a proteinaceous product. The present invention further includes a method of forming an animal feed, a method of nourishing an animal, and a proteinaceous product.

DETAILED DESCRIPTION

The present invention generally relates to a method of processing vegetable protein to enhance the solubility and color characteristics of the vegetable protein while also reducing the antigenicity of the vegetable protein. More particularly, the present invention relates to a method of chemically treating vegetable protein, such as full fat, low fat, or defatted native soy proteins, to enhance the solubility and color characteristics of the vegetable protein while also reducing the antigenicity of the vegetable protein.

The method generally may proceed as follows. First, a source of vegetable protein, a reducing agent, optionally water, and, optionally alcohol, are combined and uniformly mixed together to form an intermediate mixture. The intermediate mixture may then be heated, optionally under pressure, for a select period of time to allow reactive interaction of the components present in the intermediate mixture and transformation of the intermediate mixture into a proteinaceous product. The proteinaceous product may be dried and may then optionally be ground to a desired particle size range.

The proteinaceous product exhibits a number of beneficial properties. First, as compared to existing proteinaceous products that are prepared using the optional alcohol, but not a combination of the optional alcohol and the reducing agent, the inventive proteinaceous product exhibits increased solubility (increased Protein Dispersability Index or "PDI") and a lighter, more whitened, color, while maintaining a palatability to humans and to animals, such as ruminants, that is at least about the same as the palatability of the existing proteinaceous products. Additionally, the inventive proteinaceous product, particularly when derived from a source of soy protein, exhibits a lower concentration of antigenic proteins, such as glycinin and β-conglycinin. Thus, the process of the present invention beneficially enhances the solubility, lightness, and whiteness of proteinaceous products while also reducing the antigenic activity potential of the proteinaceous products.

In the process of the present invention, some non-exhaustive examples of suitable vegetable protein sources include oilseeds, grains, and legumes. Some non-exhaustive, exemplary oilseed sources of vegetable protein include soybeans, peanuts, cottonseed, rapeseed, canola, sesame seeds, and any combination thereof. Some non-exhaustive, exemplary grain sources of suitable vegetable protein include corn, wheat, rice, and any combination thereof. The vegetable protein source may take any form, such as that of flour, meal, grits, pellets, flakes, granules, cracked seed, cracked grain, and any combination thereof. Furthermore, the vegetable protein source may be full-fat or may have been pre-processed to either a reduced fat form or a fully defatted form. Likewise, the vegetable protein source may contain a concentrated amount of the vegetable protein, such as a concentrate or isolate version of the vegetable protein source. The protein of the vegetable protein source is preferably in a non-denatured form and has a PDI of at least about 70, more preferably at least about 80, and still more preferably at least about 90. Nonetheless, vegetable protein sources containing pretreated and partially denatured vegetable protein that permissibly may have been heat-treated, including vegetable protein sources having a PDI as low as 20 or 30, may be beneficially processed in accordance with the present invention to form the proteinaceous product.

The vegetable protein source may include any combination of any different vegetable protein sources. Also, the vegetable protein source may include any combination of any different forms of vegetable protein sources. Additionally different vegetable protein sources containing differing concentrations of vegetable protein may collectively be employed as the vegetable protein source. Furthermore, different vegetable protein sources containing non-denatured protein and/or protein with any denaturization level may collectively be employed as the vegetable protein source. The concentration of the vegetable protein source in the intermediate mixture may generally range from about 50 weight percent to about 90 weight percent, based on the total weight of the intermediate mixture. The concentration of the vegetable protein source in the intermediate mixture in some applications of particular interest ranges from about 75 weight percent to about 82 weight percent, based on the total weight of the intermediate mixture.

The alcohol that may optionally be included in the process of the present invention helps solubilize any undesirable flavor components that may be present in the vegetable protein source. After being solubilized with alcohol, volatilization of the alcohol along with water supports removal of solubilized undesirable flavor components originally present in the vegetable protein source. Therefore, to help volatilize the alcohol and solubilized undesirable flavor components along with the water, the alcohol beneficially is soluble in water, preferably is highly soluble in water, and more preferably is infinitely soluble in water. Consequently, the optional alcohol will typically be a lower alcohol. Some exemplary alcohols that may optionally be employed in the process of the present invention include methyl alcohol (methanol), ethyl alcohol (ethanol), N-propyl alcohol (1-propanol), and isopropyl alcohol (isopropanol). The concentration of the alcohol in the intermediate mixture, when optionally included, may generally range from about 5 weight percent to about 20 weight percent, based on the total weight of the intermediate mixture, with a concentration of the alcohol ranging from about 10 weight percent to about 15 weight percent, based on the total weight of the intermediate mixture, being desirable.

Generally, the reducing agent may be any chemical agent, substance, compound, or mixture, whether in gaseous, liquid, or vapor form, that is, or produces a material that is, (1) capable of donating electrons in a chemical reduction reaction or (2) capable of chemically reducing and/or reversing disulfide linking (R—S—S—R) in protein that may result from oxidative coupling of two sulfhydryl groups (R—SH). The reducing agent may include any combination of any suitable reducing agents, such as any combination of any of the reducing agents listed herein.

Some sulfhydryl compounds are exemplary reducing agents. Suitable sulfhydryl reducing agents are those compounds, whether in gaseous, liquid, or vapor form, that contain —SH groups and those compounds that are capable of initiating reactions that reduce —S—S— bonds in proteinaceous materials to yield —SH groups. Some non-exhaustive examples of suitable sulfhydryl reducing agents include cysteine; water-soluble cysteine salts, such as L-cysteine hydrochloride; sulfurous acid; and glutathione; along with compounds related to or homologous with L-cysteine hydrochloride, such as L, D, and DL cysteine; the free bases of L, D, and DL cysteine; L-cysteine mono-phosphate; di-L-cysteine sulfite; and 1-mono-cysteine tartrate.

Other suitable reducing agents include various sulfur containing compounds, whether in gaseous, liquid, or vapor form, that, though not necessarily containing any —SH group, are nevertheless capable of yielding a compound containing an —SH group, such as sulfurous acid, upon exposure of the sulfur-containing compound to liquid water and/or water vapor. Some non-exhaustive examples of such sulfur-containing compounds include sulfur dioxide ($SO_2$) or a source of sulfur dioxide, such as an $SO_2$-generating precursor. Some other exemplary sources of suitable sulfur-containing compounds include alkali metal sulfites, such as sodium sulfite and potassium sulfite; ammonium sulfite; alkali metal bisulfites, such as sodium bisulfite ($NaHSO_3$) and potassium bisulfite; ammonium bisulfite; alkali metal pyrosulfite, such as sodium pyrosulfite and potassium pyrosulfite; ammonium pyrosulfite; alkali metal meta sulfites, such as sodium meta bisulfite and potassium meta bisulfite; and ammonium meta bisulfite.

The quantity of reducing agent employed in the process of the present invention will generally depend on (1) the particular reducing agent or the combination of different reducing agents, (2) the solubility of the reducing agent(s) in the solvent(s)—ordinarily, water, if any, (3) the redox potential(s) ($E_o$) of the reducing agent(s), (4) the pH, pressure, and temperature of the intermediate mixture to be reduced; and (5) the kind and degree of action sought. The pH, pressure, and temperature of the intermediate mixture to be reduced may be conventionally controlled to selectively control the solubility of the reducing agent(s) in the solvent(s). The concentration of the reducing agent in the intermediate mixture to be reduced may generally be about 0.01 weight percent, or more, based on the total weight of the intermediate mixture, with an upper end concentration maximum of about three weight percent to about four weight percent being typical, but not limiting.

As noted above, added water is an optional component of the intermediate mixture. However, the water is preferably included in the intermediate mixture for at least a couple of reasons. First, the water may help support and increase the beneficial action of the reducing agent on the protein portion of the intermediate mixture. For example, by reference to Example 2 below, it has been observed that use of powdered sodium bisulfite and soy protein, without any added water, as in Sample No. 2-B, resulted in a somewhat lower L* (less whitened) product with a lower PDI (lower solubility) and a substantially darker visual color ranking, as compared to use of powdered sodium bisulfite, soy protein, and added water, as in Sample No. 2-C. Second, when the optional alcohol is employed, use of the added water is desirable to support enhanced evaporation of any undesirable flavor components that are solubilized in the alcohol. The concentration of the added water in the intermediate mixture, when included, may generally range from about 2 weight percent to about 15 weight percent, based on the total weight of the intermediate mixture, with a concentration of the added water ranging from about 5 weight percent to about 10 weight percent, based on the total weight of the intermediate mixture, being of particular interest.

As noted above, the alcohol is an optional component of the intermediate mixture. However, the alcohol is preferably included for at least a couple of reasons. First, the alcohol may help support and increase the beneficial action of the reducing agent on the protein portion of the intermediate mixture. For example, by reference to Example 2 below, it has been observed that use of powdered sodium bisulfite, soy protein, added water, and ethanol, as in Sample No. 2-A, resulted in a somewhat higher L* (more whitened) product with a lighter visual color ranking and an acceptable PDI (solubility), as compared to use of powdered sodium bisulfite, soy protein, and added water, without any added ethanol, as in Sample No. 2-C. Second, use of the optional alcohol is helpful for purposes of solubilizing and eliminating undesirable flavor components that may be present in the protein. Furthermore, use of the optional alcohol is believed to help lower the concentration of antigenic substances, such as glycinin and β-conglycinin, in the protein, especially when the protein is or includes soy protein.

The intermediate mixture, as indicated above, may be prepared by combining and mixing the vegetable protein source, the reducing agent, the optional water, and the optional alcohol together. The order of addition of the vegetable protein source, the reducing agent, the optional water, and the optional alcohol is not critical, though the alcohol and water, when both included, will typically be included as an aqueous solution of the alcohol. The concentration of alcohol in the aqueous solution of the alcohol may generally range from about 50 weight percent to about 80 weight percent, based on the total weight of the aqueous solution of the alcohol. The mixing of the components of the intermediate mixture may employ any type of conventional mixing, such as mechanical mixing using a hand mixer or a fixed mixer.

The intermediate mixture may be processed under increased temperature, and optionally under super-atmospheric pressure, in any conventional apparatus. For example, the intermediate mixture may be placed in a pan within an autoclave that is heated and is optionally under pressure. As another alternative, the intermediate mixture may be placed in a conventional vessel. Steam may be introduced into the autoclave or into the vessel for purposes of increasing the temperature, and optionally the pressure, within the autoclave or the vessel. As another alternative, the vessel may be equipped with steam jacketing for purposes of raising the temperature within the vessel and an appropriate gas, such as air or nitrogen, may optionally be injected into the vessel to pressurize the vessel. Furthermore, when employing pressure, the intermediate mixture may be placed within the vessel either before or after the vessel has been pressurized. Additionally, if desired, the vessel may be equipped with a suitable mixer that supports compilation and preparation of the intermediate mixture in the vessel. Furthermore, mixing of the intermediate mixture may optionally continue in the vessel using the mixer after the temperature and, if pressurized, after the pressure have been increased to the desired operating range.

The temperature of the intermediate mixture within the autoclave or vessel will generally be greater than ambient temperature, such as a temperature greater than about 90° C., and preferably ranges from about 212° F. (100° C.) to about 250° F. (121° C.). The pressure on the intermediate mixture within the autoclave or vessel may be greater than atmospheric (super-atmospheric) and preferably ranges from about 10 pounds per square inch gauge (psig) to about 30 psig.

As another alternative, the pressure on the intermediate mixture within the autoclave or vessel may be maintained at about atmospheric pressure. For example, the intermediate mixture may be steamed at about 100° C. under atmospheric pressure for the select time period of desired duration. Use of the elevated temperature, or optionally the combination of elevated pressure and elevated temperature, for the select period of time supports reactive interaction of the components present in the intermediate mixture and transformation of the intermediate mixture into the proteinaceous product. The select period of time will generally be at least about five minutes long, preferably is at least about ten minutes long, and more desirably is from about ten minutes long to about thirty minutes long.

After the select period of time, any pressure on the proteinaceous product is quickly vented to atmospheric pressure to support evaporation of water and any included alcohol along with any undesirable flavor components dissolved in the alcohol. Preferably, all, or essentially all, of the alcohol is removed from the proteinaceous product. Likewise, after the select period of time, the temperature on the proteinaceous product is allowed to drop to ambient temperature, such as a temperature of about 22° C. (72° F.).

The proteinaceous product may then be dried using any conventional drying apparatus, such as a spray dryer or a vacuum dryer, to reduce the moisture content of the proteinaceous product to about five weight percent, or less, based on the total weight of the proteinaceous product. As other suitable examples, the proteinaceous product may be air-dried, using a fan or blower, or a vacuum may be pulled on the autoclave or vessel to aid in drying the proteinaceous product. After being dried, the proteinaceous product may optionally then be ground to a desired particle size range, such as to the consistency of a meal or flour.

Though the protein content of the proteinaceous products produced in accordance with the present invention is predominantly or entirely denatured, the proteinaceous products of the present invention nevertheless beneficially exhibit a lighter color with enhanced (whiter) L* values and enhanced PDI values (reflecting increased solubility), as compared to proteinaceous products produced in a manner differing from that of the present invention. For example, as compared to products produced using alcohol (ethanol), but not the reducing agent, the proteinaceous product of the present invention exhibits L* values that are improved by at least 3.5 L* units and by as much as about 5 L* units, or even more, and exhibits PDI values that are improved by at least 2.75 PDI units and by as much as about 4.8 PDI units, or even more. Thus, as compared to products produced using alcohol (ethanol), but not the reducing agent, the proteinaceous product of the present invention is lighter and whiter in color and exhibits increased solubility.

Many proteinaceous products of the present invention, such as soy protein products, exhibit L* values ranging from greater than about 88 to at least about 92. Preferably, proteinaceous products of the present invention, such as soy protein products, exhibit L* values greater than about 89 and more preferably greater than about 90. Many proteinaceous products of the present invention, such as soy protein products, exhibit PDI values ranging from greater than about 9.8 to at least about 15. Preferably, proteinaceous products of the present invention, such as soy protein products, exhibit PDI values greater than about 11.5, more preferably greater than about 13, and still more preferably greater than about 15.

The present invention additionally includes methods of feeding that incorporate the proteinaceous product, such as soy protein product. For example, the present invention encompasses a method of feeding young humans and young animals, such as young monogastric animals or young ruminants, the proteinaceous product, such as soy protein product. Though the method of feeding the proteinaceous product is characterized herein primarily in terms of feeding young humans and young animals, the feeding method of the present invention is not limited to only young humans and young animals. In fact, beneficial results accrue from feeding humans of any age and animals of any age the proteinaceous product, such as soy protein product. Furthermore, though the method of feeding young animals is characterized herein primarily in terms of feeding young ruminants, the feeding method of the present invention is not limited to only young ruminants. In fact, beneficial results accrue from feeding any animals, such as any monogastric animal (pigs, horses, and dogs, for example) of any age the proteinaceous product, such as soy protein product. Additionally, besides incorporating the proteinaceous product of the present invention, such as soy protein product, in milk replacers, it is believed the proteinaceous product, such as soy protein product, may beneficially be incorporated into any human or animal food or beverage. Particularly advantageous results are achieved when the proteinaceous product, such as soy protein product, is incorporated in human or animal foods or beverages that benefit from a highly soluble protein source.

Beneficially, when young ruminants are provided with the proteinaceous product, such as soy protein product, produced in accordance with the present invention, the young ruminants are surprisingly found to gain more weight during a feeding period, such as a select portion of a pre-weaning period, as compared to other young ruminants that are fed soy protein product not produced in accordance with the present invention. As used herein, the term "ruminant" means an even-toed, hoofed animal that has a complex 3- or 4-chamber stomach and typically re-chews what the ruminant has previously swallowed. Some non-exhaustive examples of ruminants include cattle, sheep, goats, oxen, musk, ox, llamas, alpacas, guanicos, deer, bison, antelopes, camels, and giraffes.

The method of feeding young animals (also referred to herein as nourishing young animals) entails feeding young animals according to a feeding regimen prior to weaning during a pre-weaning period. During the pre-weaning period, the young animals are fed a fluid animal feed that preferably includes some of the proteinaceous product of the present invention. The proteinaceous product may optionally be supplied to the young animals separately from the fluid animal feed, but is preferably orally supplied to the young animals as part of the fluid animal feed. During the portion of the pre-weaning period when the young animals are supplied with the fluid animal feed that preferably includes some of the proteinaceous product, there is no need to supply any other nutrition, such as dry animal feed, haylage, or silage to the young animals. In addition to the fluid animal feed and the proteinaceous product, the young animals also have free access to water ad libitum.

Weaning occurs when liquid feed is withdrawn from the diet of the young animals. Thus, as used herein, the term "pre-weaning period" refers to the period when nutrients are predominantly or entirely supplied to the young animal, such as the calf, in liquid form, as part of a liquid feed, and the term "post-weaning period" refers to the period when nutrients are no longer predominantly or entirely provided to the young animal, such as the calf, in the form of liquid feed. For ruminants, the post-weaning period is sometimes also referred to as the "ruminant period."

The fluid animal feed that is provided during the pre-weaning period may generally include any fluid milk replacer that, in combination with the proteinaceous product, provides a level of nutrition to the young animals, such as the young ruminants, that is sufficient to support the nutritional requirements of the young animals during the pre-weaning period. As used herein, the term "fluid milk replacer" means any fluid milk product that is provided to a young animal in place of milk that a female animal (such as milk of the young animal's mother) would ordinarily produce and provide to the young animal via nursing. Such substitution of the fluid milk replacer for the milk of the female animal is an acceptable form of dairy herd management that offers various advantages.

For example, use of fluid milk replacer may save the dairy producer money depending upon the amount of fluid milk replacer substituted for mother's milk in newborn calf nourishment. Fluid milk replacers also permit flexible modification of the nutrient mix fed to young animals, such as newborn animals, to supply unique nutrients to the newborn animals that are not normally present in milk produced by the female animal. As another example, weaning newborn calves off milk produced and provided by the calves' mothers frees up the mother cows to perform other dairy-based operations, such as providing milk for human consumption or conversion to more valuable dairy products, such as cheese.

The fluid milk replacer may be liquid milk replacer, rehydrated milk replacer that is formed by rehydrating dry or powdered milk replacer, or a combination of liquid milk replacer and rehydrated milk replacer. As used herein, the term "liquid milk replacer" refers to milk replacer that is in liquid form when purchased. Often, if not predominantly, liquid milk replacer is based upon dry or powdered milk replacer that has been rehydrated. As used herein, the term "rehydrated milk replacer" refers to milk replacer that is prepared as a liquid, after purchase or preparation of dry or powdered milk replacer, by rehydrating the dry or powdered milk replacer.

The proteinaceous product is preferably provided to the young animals, such as the young ruminants, as part of the fluid animal feed, though the proteinaceous product may optionally be provided separately from the fluid animal feed. The fluid animal feed may, and preferably does, include antibiotics to help control scours and enhance the respiratory health of the young animals. Some non-exhaustive examples of desirable antibiotics include Neomycin and Oxytetracycline, which are preferably provided in the fluid animal feed in combination with each other.

The fluid animal feed may optionally also include any other nutritional component that is capable of remaining dissolved or in suspension in the fluid animal feed. Some non-exhaustive examples of other nutritional components that are typically capable of remaining dissolved or in suspension in the fluid animal feed and that may therefore typically be incorporated as part of the fluid animal feed include sugar(s); sugar solution(s); sugar alcohol(s); protein material(s), such as vegetable protein material(s), animal protein material(s), and marine protein material(s); bean-based or grain-based oil(s); bean-based or grain-based meal(s); bean-based or grain-based syrup(s); fatty acid(s); and any of these in any combination. Preferably, however, the fluid animal feed primarily consists of, and more preferably consists essentially of, the fluid milk replacer, any optionally added antibiotics, and the proteinaceous product.

The fluid milk replacer, when purchased as liquid milk replacer, may generally be any commercially available liquid milk replacer. The fluid milk replacer, when prepared from powdered or dry milk replacer, may be formulated and prepared as the rehydrated milk replacer by those responsible for feeding the ruminants. Some examples of suitable powdered milk replacers for forming the rehydrated milk replacer include AMPLIFIER® MAX NT powdered milk replacer, AMPLIFIER® Select NT powdered milk replacer, MAXI CARE® NT powdered milk replacer, and Nursing Formula™ NT powdered milk replacer that are each available from Land O'Lakes, Inc. of Arden Hills, Minn.

The fluid milk replacer may generally include any concentration of crude protein. However, the fluid milk replacer preferably contains about 16 to about 35 weight percent crude protein, based on the total dry weight of the fluid milk replacer, to help optimize weight gain by the young animals, such as the young ruminants. Likewise, the fluid milk replacer may contain any concentration of fat, but preferably contains about 5 to about 30 weight percent fat, based on the total dry weight of the fluid milk replacer, to increase the energy content of the fluid milk replacer, help reduce the incidence of scours in the young animals, and inhibit deleterious effects of any stress the young animals experience.

Some examples of preferred fat sources for the fluid milk replacer are edible lard and high quality vegetable fats that may be used individually or in any combination. The fat in the fluid milk replacer is preferably homogenized to reduce the particle size of the fat and enhance the digestibility of the fat. One preferred form of the fluid milk replacer includes about 28 weight percent crude protein and about 20 weight percent fat, based on the total dry weight of the fluid milk replacer.

If dry or powdered milk replacer is used, the dry or powdered milk replacer may be rehydrated with water, any edible aqueous fluid, such as fluid milk, or any combination of any of these to form the fluid milk replacer. The concentration of the dry or powdered milk replacer in the water or aqueous fluid may be varied in any ratio, depending on the desired concentration of nutrients in the fluid milk replacer and the desired consistency of the fluid milk replacer. Preferably, however, the powdered or dry milk replacer is rehydrated in water to form fluid milk replacer having a total solids concentration ranging from about 10 weight percent to about 20 weight percent, based upon the total weight of the fluid milk replacer. Of course, rehydrated milk replacer may also be combined with liquid milk replacer to form the fluid milk replacer. Likewise, dry or powdered milk replacer may be rehydrated by combining dry or powdered milk replacer with liquid milk replacer and, optionally, additional water and/or additional aqueous fluid.

The fluid animal feed maybe prepared by combining an animal feed component, such as powdered or dry milk replacer, and, optionally any other nutritional component(s). Preferably, the proteinaceous product is also incorporated in the fluid animal feed. As used herein, the term "animal feed component" generally refers, collectively, to any and all milk replacer(s), such as dry or powdered milk replacer(s), fluid milk replacer(s), liquid milk replacer(s), and/or rehydrated milk replacer(s) incorporated in the fluid animal feed. The fluid animal feed should include an effective amount of the animal feed component, and the overall ration provided to the animal, as the fluid animal feed that incorporates the proteinaceous product or as any separately provided combination of the fluid animal feed and the proteinaceous product, should include an effective amount of the proteinaceous product.

As used herein, the term "effective amount of the animal feed component" means an amount of the animal feed component that, in combination with the effective amount of the proteinaceous product, is sufficient to satisfy the nutritional requirements of young animal(s), such as young ruminant(s), during the pre-weaning period, or portion of the pre-weaning period, when the animal feed component is supplied to the young animal(s), no matter whether the proteinaceous product is included as part of, or separately from, the fluid animal feed. As used herein, the term "effective amount of the proteinaceous product" means an amount of the proteinaceous product, that is sufficient to satisfy the protein requirements of young animal(s), such as young ruminant(s), during the pre-weaning period, or portion of the pre-weaning period, when the proteinaceous product is supplied to the young animal(s), no matter whether the fluid animal feed incorporates the proteinaceous product or the fluid animal feed and the proteinaceous product are separately provided to the young animal in any combination.

The proteinaceous product that is produced and employed in accordance with the present invention provides optimum results when included as part of the dry form of the animal feed component, such as powdered or dry milk replacer. Thus, the proteinaceous product is preferably incorporated in the fluid animal feed. Incorporating the proteinaceous product as part of the dry form of the animal feed component prior to addition of water simplifies the distribution and use of the animal feed component. In particular, the dry form of the animal feed component that incorporates the proteinaceous product may be transported as a pre-mixed composition that is later combined with water (or an aqueous fluid). This allows simpler distribution so the person supplying the fluid animal feed to the animals does not have to accurately mix the animal feed component and the proteinaceous product prior to feeding the fluid animal feed to the young animals.

Shortly before feeding the fluid animal feed to young animals, such as young ruminants, the dry form of the animal feed component along with the proteinaceous product that is preferably incorporated into the animal feed component, may be mixed with an effective amount of water to form the fluid animal feed. As used herein, the term "effective amount of water" means an amount of water that is sufficient to provide the fluid animal feed with a texture and consistency that is similar to the texture and consistency of fluid milk. Of course, besides water, the "effective amount of water" takes into account the water content of any aqueous fluid other than, or in addition to, water that is combined with the dry form of the animal feed component Besides the proteinaceous product, another product of the present invention may be characterized as an animal ration, such as a ruminant ration. The ruminant ration includes at least the animal feed component and the proteinaceous product, where the proteinaceous product is preferably incorporated into the animal feed component, as previously discussed. When the proteinaceous product is incorporated into the animal feed component, the proteinaceous product is incorporated at a rate that provides the animal feed component with the desired protein concentration. For example, when the animal feed component is an animal milk replacer, such as a calf milk replacer, with an existing crude protein content and the proteinaceous product is incorporated into the animal feed component, the existing crude protein content of the animal milk replacer is typically replaced with the proteinaceous product on a pound crude protein per pound crude protein basis. Consistent with the discussion provided above about the protein content of the fluid milk replacer, when the proteinaceous product is incorporated into the animal feed component, the proteinaceous product is preferably incorporated in an amount that will provide the fluid milk replacer with a crude protein content ranging from about 16 to about 35 weight percent crude protein, based on the total dry weight of the fluid milk replacer.

Various analytical techniques are employed herein. An explanation of these techniques follows. All values presented in this document for a particular parameter, such as weight percent total protein, weight percent fat, and weight percent total solids, are based on the "as is" sample and are therefore on a "wet basis", unless otherwise specified herein.

Property Determination and Characterization Techniques

Total Solids Determination

To determine the weight percent total solids, wet basis, in a sample, the actual weight of total solids is determined by analyzing the sample in accordance with Method #925.23 (33.2.09) of *Official Methods of Analysis*, Association of Official Analytical Chemists (AOAC) (16th Ed., 1995). The weight percent total solids, wet basis, is then calculated by dividing the actual weight of total solids by the actual weight of the sample and multiplying the result by 100%. The total moisture content of the sample may be determined by subtracting the actual weight of total solids in the sample from actual weight of the sample. The weight percent of water in the sample may then be calculated by dividing the actual weight of moisture in the sample by the actual weight of the sample and multiplying the result by 100%.

Total Protein Determination

To determine the weight percent total protein (crude protein), wet basis, in a sample, the actual weight of total protein is determined in accordance with Method #991.20 (33.2.11) of *Official Methods of Analysis*, Association of Official Analytical Chemists (AOAC) (16th Ed., 1995). The value determined by the above method yields "total Kjeldahl nitrogen," which is equivalent to "total protein" since the above method incorporates a factor that accounts for the average amount of nitrogen in protein. Since any and all total Kjeldahl nitrogen determinations presented herein are based on the above method, the terms "total Kjeldahl nitrogen," "total protein," and "crude protein" are used interchangeably herein. Furthermore, those skilled in the art will recognize the term "total Kjeldahl nitrogen" is generally used in the art to mean "total protein" with the understanding the factor has been applied. The weight percent total protein, wet basis, is calculated by dividing the actual weight of total protein by the actual weight of the sample and multiplying the result by 100%.

Fat Determination

To determine the weight percent fat, wet basis, in a sample, the actual weight of fat in the sample is determined in accordance with Method #974.09 (33.7.18) of *Official Methods of Analysis*, Association of Official Analytical Chemists (AOAC) (16th Ed., 1995). The weight percent fat, wet basis, is then calculated by dividing the actual weight of fat in the sample by the actual weight of the sample and multiplying the result by 100%.

Protein Dispersability Index (PDI) Determination

This method is used to determine the Protein Dispersability Index (PDI) of a particular sample that contains protein. The Protein Dispersability Index is a measure of the soluble protein content in a sample, expressed as a percent, by weight, of the crude protein weight in the sample. Consequently, the Protein Dispersability Index is equivalent to the weight percent of soluble protein in a sample, based upon the total weight of crude protein in the sample. The Protein Dispersability Index (PDI) of a particular sample that contains protein may be determined in accordance with Method No. 46-24 (1995), entitled *Protein Dispersability Index*, of the American Association of Cereal Chemists (AACC).

The current address of the American Association of Cereal Chemists is 3340 Pilot Knob Road, St. Paul, Minn. 55121.

Reflectance Spectra Determination

The color of any sample of a stream prepared in accordance with the present invention may be characterized in terms of the L* (lightness/darkness) value of the stream in the CIELAB colorspace. Increasing L* values (L* moves toward +100) correlate to increasing lightness (increasing "whiteness"). Correspondingly, decreasing L* values (L* moves toward 0) correlate to decreasing lightness (increasing "blackness").

Unless otherwise indicated, all reflectance spectra may be determined in accordance with the following procedure that relies on a commercially available reflectometer, the Hunter LabScan II Colorimeter, that is available from Hunter Associates Laboratory, Inc ("Hunter") of Reston, Va. A white calibration standard, part number 11-010850, and a black calibration standard, part number 11-005030, each available from Hunter, may be used to calibrate the Hunter LabScan II Colorimeter. Spectral data obtained by the Hunter LabScan II Colorimeter are converted by the Colorimeter into various spectral values, including the CIELAB L* (lightness) colorspace variable.

Before the reflectance spectra are evaluated for a particular sample, the Hunter LabScan II Colorimeter is calibrated to the appropriate calibration standards supplied by Hunter. First, the Colorimeter takes a reading after being placed against the white calibration standard (part number 11-010850) supplied by Hunter. Then, the Colorimeter takes another reading after being placed against the black calibration standard (part number 11-005030) supplied by Hunter. The Colorimeter software then evaluates the two readings and makes any necessary calibration adjustments before reflectance spectra of samples are measured.

The reflectance spectrum of a particular powdered sample (spray-dried or freeze-dried to less than 5% moisture, by weight) is evaluated by placing a powder cup (filled about 1 to 2 centimeters high with the sample) on the Hunter LabScan II Colorimeter measurement window. A suitable powder cup may be obtained from Agtron Instruments, a division of Magnuson Engineers, Inc., of San Jose, Calif. The Colorimeter is programed to characterize spectral data in terms of the CIELAB L* (lightness) colorspace variable. Determination of the L* value for a particular dried sample entails five separate measurements of spectral data. Thus, the L* value for each dried sample is based on an average of five separate spectral measurements.

Scour Documentation

The scour level of an animal, such as a ruminant, or of a group of animals, such as a group of ruminants, may be quantified in accordance with this procedure. First, Scour Scores are rated on a scale of 1 to 4, for each individual animal, based on the appearance of the animal's feces using the following score definitions:
 Scour Score=1 for a normal feces
 Scour Score=2 for loose feces
 Scour Score=3 for feces exhibiting separated water
 Scour Score=4 for diarrhea indicative of severe calf dehydration A scour score is assigned daily to each animal, according to this scale. For an individual animal, the scour scores over a period of days may be averaged to determine an average scour score for that animal over the period. For a group of animals, the scour scores assigned to the different animals on each day of the period may be averaged to determine an average scour score for that group of animals over the period.

As another alternative, changes in the scour status for a particular animal maybe tracked by noting, for example, the number of days during the period when the scour score was greater than 1 versus the number of days during the period when the scour score was equal to 1. Likewise, differences in scour status between different animals over a particular period may be tracked and characterized by comparing the number of days during the period when the scour score was equal to 1 for the different animals of the group.

Respiratory Distress Documentation

The respiratory distress level of an animal, such as a ruminant, or for a group of animals, such as a group of ruminants, may be quantified in accordance with this procedure. First, respiratory scores are rated on a scale of 0 to 1, for each individual animal based on the following definitions:
 A Respiratory Score of 0 is assigned on a particular day if the animal is not given antibiotics for treatment of a respiratory infection.
 Alternatively, a Respiratory Score of 1 is assigned on a particular day if the animal is given antibiotics for treatment of a respiratory infection.

A respiratory score is assigned daily to each animal, according to this scale. For an individual animal, the respiratory scores over a period of days may be averaged to determine an average respiratory score for that animal over the period. For a group of animals, the respiratory scores assigned to the different animals on each day of the period maybe averaged to determine an average respiratory score for that group of animals over the period.

As another alternative, changes in respiratory health for a particular animal, such as a particular animal, may be tracked by noting, for example, the number of days during the period when the respiratory score was 1 versus the number of days during the period when the respiratory score was 0. Likewise, differences in respiratory health between different animals over a particular period may be tracked and characterized by comparing the number of days during the period when the respiratory score was equal to 1 versus the number of days during the period when the respiratory score was 0 for the different animals of the group.

The present invention is more particularly described in the following examples which are intended as illustrations only since numerous modifications and variations within the scope of the present invention will be apparent to those skilled in the art.

EXAMPLES

Examples 1, 2, and 3 below demonstrate some exemplary aspects of the method of processing vegetable protein in accordance with the present invention. The processing in accordance with the present invention that is described in Examples 1, 2, and 3 is effective to improve the solubility characteristics of the soy protein product, as compared to the solubility characteristics of soy protein products not produced in accordance with the present invention while also producing soy protein products with reduced antigenicity, relative to the starting soy protein, as compared to the antigenicity characteristics of soy protein products not produced in accordance with the present invention while also. Example 4 below demonstrates some exemplary aspects of the method of making an animal feed and the method of feeding animals the soy protein product of the present invention. The details of Example 4 demonstrate that feeding animals the soy protein product of the present invention beneficially produces results that are at least equal to, and sometimes improved relative to results obtained from feeding animals soy protein products not produced in accordance with the present invention.

Example 1

In this example, defatted soybean flour, an aqueous ethanol solution, and powdered sodium bisulfite ($NaHSO_3$) were uniformly blended together by mechanical mixing to form several different intermediate mixtures. The defatted soybean flour was at least predominantly non-denatured and had a PDI value of about 90. The aqueous ethanol solution had a concentration of 60 weight percent alcohol (and thus 40 weight percent water), based on the total weight of the aqueous ethanol solution. The intermediate mixtures were further processed to form various soy protein products.

Details about the soy protein products produced in this example are provided in Table 1 below. The soy protein products identified as Sample Nos. 1-A, 1-B, and 1-C in Table 1 were based on a form of the intermediate mixture that contained 80 parts by weight of the defatted 90 PDI soybean flour, 20 parts by weight of the aqueous ethanol solution (60 weight percent alcohol), and differing concentrations of the powdered sodium bisulfite. The intermediate mixture used to form the Sample No. 1-A soy protein product contained 0.5 weight percent powdered sodium bisulfite, the intermediate mixture used to form the Sample No. 1-B soy protein product contained 1.0 weight percent of the powdered sodium bisulfite, and the intermediate mixture used to form the Sample No. 1-C soy protein product contained 2.0 weight percent of the powdered sodium bisulfite, based on the total weight of 90 PDI soy flour in the respective intermediate mixtures. For purposes of comparison, a comparative soy protein product not produced in accordance with the present invention and identified as the Comparative Sample in Table 1 was prepared in this example. The Comparative Sample was based on a mixture of 80 parts by weight of the defatted 90 PDI soybean flour and 20 parts by weight of the aqueous ethanol solution (60 weight percent alcohol) that did not include any of the powdered sodium bisulfite.

The intermediates used to produce the soy protein products of Sample Nos. 1-A, 1-B, and 1-C along with the mixture used to produce the Comparative Sample of this example were spread in separate shallow trays to a uniform depth of about one centimeter. The four trays were then placed in an autoclave. High pressure steam was introduced into the autoclave to quickly (within about a minute) raise the temperature of the atmosphere in the autoclave to about 250° F. Steam introduction into the autoclave was ceased after the temperature of the atmosphere in the autoclave reached about 250° F. Due to the steam introduction, the pressure within the autoclave quickly rose to a pressure in the range extending from about 10 pounds per square inch gauge (psig) to about 30 psig.

The four trays were maintained in the steam-pressurized, 250° F. atmosphere of the autoclave for about fifteen minutes. When the fifteen minute holding period was completed, the steam was quickly vented from the autoclave, and the four trays were immediately removed from the autoclave. The four trays were then placed in front of a fan to dry the contents of the trays. The contents of the trays were then separately ground into fine flour. The L* values and the PDI values were then determined for the four different flours using the *Reflectance Spectra Determination* and the *Protein Dispersability Index (PDI) Determination* procedures provided above in the PROPERTY DETERMINATION AND CHARACTERIZATION TECHNIQUES section of this document. The L* values and the PDI values determined for the four different flours are provided in Table 1 below.

that was not based on sodium bisulfite treatment. Furthermore, increases in the concentration of sodium bisulfite used to produce the soy protein products of Sample Nos. 1-A, 1-B, and 1-C resulted in dose-response increases of the color rank and L* value for these three soy protein products.

Example 2

This example demonstrates the impact of excluding alcohol, the impact of excluding the reducing agent, and the impact of excluding added water from the intermediate in the course of producing soy protein products. The defatted soybean flour described in Example 1, the aqueous ethanol solution described in Example 1, and the powdered sodium bisulfite ($NaHSO_3$) described in Example 1 were employed in the course of producing soy protein products in this example. The defatted soybean flour was at least predominantly non-denatured and had a PDI value of about 90. The aqueous ethanol solution had a concentration of 60 weight percent alcohol (and thus 40 weight percent water), based on the total weight of the aqueous ethanol solution. The components included in a particular trial of this example were uniformly blended by mechanical mixing to form an intermediate mixture. The various intermediate mixtures of this example were then further processed as detailed in Example 1 to form various soy protein products.

Details about the various soy protein products produced in this example are provided in Table 2 below. The soy protein product identified as Sample No. 2-A in Table 2 was based on a form of the intermediate mixture that contained 80 parts by weight of the defatted 90 PDI soybean flour, 20 parts by weight of the aqueous ethanol solution (60 weight percent alcohol), and 0.5 weight percent of the powdered sodium bisulfite, based on the total weight of the 90 PDI soy flour.

The soy protein product identified as Sample No. 2-B in Table 2 was based on a form of the intermediate mixture that contained 80 parts by weight of the defatted 90 PDI soybean flour and 0.5 weight percent of the powdered sodium bisulfite, based on the total weight of the 90 PDI soy flour, but none of the aqueous ethanol solution and no added water. The soy

TABLE 1

| Sample I.D. | Treatment Description[A] | Visual Color Rank[B] | L* Value[C] | PDI | % Increase in PDI versus PDI of Comparative Sample |
|---|---|---|---|---|---|
| Comparative Sample | Water + Alcohol | 1 | 80.63 | 7.37 | 100 |
| 1-A | Water + Alcohol + 0.5%[D] $NaHSO_3$ | 2 | 89.78 | 11.52 | 156 |
| 1-B | Water + Alcohol + 1.0%[D] $NaHSO_3$ | 3 | 90.57 | 13.38 | 182 |
| 1-C | Water + Alcohol + 2.0%[D] $NaHSO_3$ | 4 | 91.58 | 15.05 | 204 |

[A]List of substances used in the treatment of the 90 PDI soy flour.
[B]On a scale of 1 to 4, where 1 is the darkest scale reading and 4 is the lightest scale reading.
[C]On a scale of 0 to 100, where 1 is Black and 100 is White; based on the Reflectance Spectra procedure provided in the PROPERTY DETERMINATION AND CHARACTERIZATION TECHNIQUES section of this document.
[D]Expressed in weight percent based on the total weight of 90 PDI soy flour.

The results provided in Table 1 demonstrate that incorporation of sodium bisulfite in accordance with the present invention caused the soy protein products of Sample Nos. 1-A, 1-B, and 1-C to have significantly lighter visual color ranks and a significantly higher (i.e.: lighter) L* values, as compared to the visual color rank and L* value of the Comparative Sample protein product identified as Sample No. 2-C in Table 2 was based on a form of the intermediate mixture that contained 80 parts by weight of the defatted 90 PDI soybean flour, 20 parts by weight de-ionized water, and 0.5 weight percent of the powdered sodium bisulfite, based on the total weight of the 90 PDI soy flour, but none of the aqueous ethanol solution.

For purposes of comparison, a couple of comparative soy protein products not produced in accordance with the present invention and identified as Comparative Sample 1 and Comparative Sample 2 in Table 2 were prepared in this example. Comparative Sample 1 of this example was based on 80 parts by weight of the defatted 90 PDI soybean flour. No deionized water, none of the aqueous alcohol solution, and none of the powdered sodium bisulfite were employed when producing the soy protein product of Comparative Sample 1. Comparative Sample 2 of this example was based on a mixture that contained 80 parts by weight of the defatted 90 PDI soybean flour and 20 parts by weight of the aqueous ethanol solution (60 weight percent alcohol), but none of the powdered sodium bisulfite.

The intermediates used to produce the soy protein products of Sample Nos. 2-A, 2-B, and 2-C along with the defatted 90 PDI soybean flour used to produce the soy protein product of Comparative Sample 1 and the mixture used to produce the soy protein product of Comparative Sample 2 were spread in five separate shallow trays, autoclaved under the conditions described in Example 1, and separately ground into fine flours, as described in Example 1. The $L^*$ values and the PDI values were then determined for the five different flours using the *Reflectance Spectra Determination and Protein Dispersability Index (PDI) Determination* procedures provided above in the PROPERTY DETERMINATION AND CHARACTERIZATION TECHNIQUES section of this document. The $L^*$ values and the PDI values determined for the five different flours are provided in Table 2 below.

ment), the Comparative Sample 2 soy protein product (derived using aqueous ethanol solution, but no sodium bisulfite), and the Sample No. 2-B soy protein product (derived using powdered sodium bisulfite only). Use of powdered sodium bisulfite and added water in the absence of any alcohol also significantly increased the $L^*$ value (lightness) of the Sample No. 2-C soy protein product, relative to the $L^*$ value (lightness) of the Comparative Sample 1 soy protein product, the Comparative Sample 2 soy protein product, and the Sample No. 2-B soy protein product.

Furthermore, use of powdered sodium bisulfite and added water in the absence of any alcohol greatly increased the protein dispersability index (PDI) of the Sample No. 2-C soy protein product, relative to the protein dispersability index (PDI) of the Sample No. 2-A soy protein product (derived using aqueous ethanol solution and sodium bisulfite). However, the $L^*$ value (lightness) of the Sample No. 2-A soy protein product was somewhat greater (lighter) and the visual color ranking of the Sample No. 2-A soy protein product was improved (lighter), as compared to the $L^*$ value (lightness) and visual color ranking of the Sample No. 2-C soy protein product (derived using water and sodium bisulfite, but no ethanol).

Example 3

In this example, defatted soybean flour, water, ethanol (100 weight percent ethanol), and powdered sodium bisulfite ($NaHSO_3$) were uniformly blended together by mechanical

TABLE 2

| Sample I.D. | Treatment Description[A] | Visual Color Rank[B] | $L^*$ Value[C] | PDI | % Increase in PDI versus PDI of Comparative Sample 1 |
|---|---|---|---|---|---|
| Comparative Sample 1 | None[D] | 1 | 79.82 | 6.47 | 100 |
| Comparative Sample 2 | Water + Alcohol[D] | 3 | 84.63 | 7.06 | 109 |
| 2-A | Water + Alcohol + $NaHSO_3$ | 5 | 89.79 | 9.81 | 153 |
| 2-B | $NaHSO_3$ (powdered) | 2 | 85.45 | 7.34 | 113 |
| 2-C | Water + $NaHSO_3$ | 4 | 88.13 | 11.93 | 184 |

[A]List of substances used in the treatment of the 90 PDI soy flour.
[B]On a scale of 1 to 4, where 1 is the darkest scale reading and 4 is the lightest scale reading.
[C]On a scale of 0 to 100, where 1 is Black and 100 is White; based on the Reflectance Spectra procedure provided in the PROPERTY DETERMINATION AND CHARACTERIZATION TECHNIQUES section of this document.
[D]Comparative Sample 1 and Comparative Example 2 were based upon 90 PDI soy flour that had not been subjected to the action of any reducing agent and therefore were not formed in accordance with the present invention.

The results provided in Table 2 demonstrate that incorporation of powdered sodium bisulfite without added water nominally improved the $L^*$ value (i.e.: lightened) of the Sample No. 2-B soy protein product and nominally increased the protein dispersability index (PDI) of the Sample No. 2-B soy protein product, as compared to the $L^*$ value and protein dispersability index (PDI) of the Comparative Sample 2 soy protein product that was derived using the aqueous ethanol solution and no sodium bisulfite.

Use of powdered sodium bisulfite and added water in the absence of any alcohol substantially enhanced the protein dispersability index (PDI) of the Sample No. 2-C soy protein product, relative to the protein dispersability index (PDI) of the Comparative Sample 1 soy protein product (no treatmixing to form an intermediate mixture used to produce the soybean protein product identified in Table 3 as Sample No. 3, in accordance with the present invention. For purposes of comparison, a comparative soy protein product not produced in accordance with the present invention and identified as the Comparative Sample in Table 3 was also prepared in this example. The Comparative Sample of this example was based on a uniformly blended mixture of defatted soybean flour, water, and ethanol (100 weight percent ethanol), but no sodium bisulfite ($NaHSO_3$). The defatted soybean flour used to prepare the soy protein products of Sample No. 3 and the Comparative Sample was at least predominantly non-denatured and had a PDI value of about 90. The mixtures of the Comparative Sample and Sample No. 3 were further processed to form soy protein products, as detailed below. Details about the soy protein products produced in this example are provided in Table 3 below.

The soy protein product identified as Sample No. 3 in Table 3 and produced in accordance with the present invention was based on a form of the intermediate mixture that contained 4500 pounds of the defatted 90 PDI soybean flour, 108 gallons (711 pounds) of the 100 weight percent ethanol, 54 gallons (450.4 pounds) of water, and 22.5 pounds of the powdered sodium bisulfite. Thus, based on the total weight of the intermediate mixture, the intermediate mixture that formed the basis of the Sample No. 3 soy protein product contained about 79.2 weight percent of the defatted 90 PDI soybean flour, about 12.5 weight percent of the pure ethanol, about 7.9 weight percent water, and about 0.4 weight percent of the powdered sodium bisulfite.

The soy protein product of the Comparative Sample listed in Table 3 was based on a mixture that contained 4500 pounds of the defatted 90 PDI soybean flour, 108 gallons (711 pounds) of the 100 weight percent ethanol, and 54 gallons (450.4 pounds) of water. Thus, based on the total weight of the mixture, the mixture that formed the basis of the Comparative Sample soy protein product contained about 79.5 weight percent of the defatted 90 PDI soybean flour, about 12.5 weight percent of the pure ethanol, and about 8.0 weight percent water.

The mixtures used to produce the soy protein products of the Comparative Sample and Sample No. 3 were separately processed under pressure in a steam-jacketed, mixer-equipped, pressure vessel. High pressure steam was introduced into the steam jacket of the vessel to quickly (within a few minutes) raise the temperature of the particular mixture being processed to a temperature ranging from about 220° F. to about 250° F. The pressure in the vessel was in the range extending from about 10 pounds per square inch gauge (psig) to about 30 psig following introduction of the steam. Steam introduction into the vessel jacket was continued intermittently only insofar as necessary to maintain the temperature of the particular mixture in the range from about 220° F. to about 250° F.

After holding the intermediate mixture at the temperature in the range from about 220° F. to about 250° F. for about thirty minutes, the steam was quickly vented from the vessel, and the vessel was subjected to vacuum for a time sufficient to dry the resulting soybean protein products to a moisture content of about five weight percent, or less. The soybean protein products of the Comparative Sample and Sample No. 3 were then separately ground into fine flour. The L* values and the PDI values were then determined for the two different flours using the *Reflectance Spectra Determination* and the *Protein Dispersability Index (PDI) Determination* procedures provided above in the PROPERTY DETERMINATION AND CHARACTERIZATION TECHNIQUES section of this document. The L* values and the PDI values determined for the two different flours are provided in Table 3 below.

TABLE 3

| Sample I.D. | Treatment Description[A] | Visual Color Rank[B] | L* Value[C] | PDI | % Increase in PDI versus PDI of the Comparative Sample |
|---|---|---|---|---|---|
| Comparative Sample | Water + Alcohol | 1 | 84.63 | 7.06 | 100 |
| 3 | Water + Alcohol + NaHSO$_3$ | 2 | 89.79 | 9.81 | 139 |

[A]List of substances used in the treatment of the 90 PDI soy flour.
[B]On a scale of 1 to 4, where 1 is the darkest scale reading and 4 is the lightest scale reading.
[C]On a scale of 0 to 100, where 1 is Black and 100 is White; based on the Reflectance Spectra procedure provided in the PROPERTY DETERMINATION AND CHARACTERIZATION TECHNIQUES section of this document.

The results provided in Table 3 demonstrate that incorporation of powdered sodium bisulfite, along with water and ethanol, substantially improved the L* value (i.e.: lightened) and the protein dispersability index (PDI) of the Sample No. 3 soy protein product relative to the L* value (i.e.: darker) and the protein dispersability index (lower) of the Comparative Sample soy protein product of this example.

Example 4

This example demonstrates the effect of feeding the soy protein product of the present invention to young calves during the pre-weaning period. In a first trial conducted in this example, the test calves were handled according to a "Control" treatment; the Control treatment employed an existing, commercially available calf milk replacer that contained soy protein processed in accordance with an existing process. In a second trial conducted in this example, the test calves were handled according to a "Test" treatment; the Test treatment employed a modified form of the calf milk replacer used in the Control treatment. In the Test treatment, the soy protein component of the calf milk replacer was replaced with soy protein product produced in accordance with the present invention.

In this example, forty (40) Holstein bull calves from Wisconsin ranging in age from 3 days old to 10 days old and averaging about 99.3 pounds each, with a range of about 95 pounds to about 105 pounds each, were assigned to either the Control treatment or the Test treatment. Gamma globulin, as measured by the Zinc Sulfate Turbidity test and expressed in weight percent gamma globulin, was determined for each calf. Each calf was then assigned to either level (1), level (2), level (3), level (4), or level (5), based on the gamma globulin concentration for the calf, in accordance with the following schedule:

| Level No. | Gamma Globulin Concentration |
|---|---|
| 1 | 0.00 to 0.49 weight percent |
| 2 | 0.50 to 0.99 weight percent |
| 3 | 1.00 to 1.49 weight percent |
| 4 | 1.50 to 2.49 weight percent |
| 5 | 2.50 weight percent or higher |

Equal numbers of calves from each of the five different gamma globulin concentration levels were placed in the Control treatment and the Test treatment.

The calves in the Control and Test treatments were each fed and monitored during both the pre-weaning period and the post-weaning period. Details about the handling and feed consumption for the calves of these two different treatments during the pre-weaning period are provided in Tables 4-11 below. The pre-weaning period of this example spanned a total of four weeks (twenty-eight days) for the calves of the Control and Test treatments.

During the pre-weaning period, none of the calves of the two treatments had any access to any dry calf starter. However, during the pre-weaning period, each calf of each treatment had continuing and equal access to fresh water, ad libitum. Furthermore, each test calf in the two treatments received veterinary care and management consistent with appropriate recommendations in the *Guide for the Care and Use of Agricultural Animals in Agricultural Research and Teaching.* (1st Edition, March 1988).

The calves of the Control and Test treatments each received a rehydrated (with water) form of calf milk replacer during the pre-weaning period. The calf milk replacer that was provided to the calves of the Control and Test treatments had a crude protein concentration of about 22 weight percent, based on the dry weight of the calf milk replacer, and a fat concentration of about 20 weight percent, based on the dry weight of the calf milk replacer.

The calf milk replacer fed to the calves in the Control treatment was the MAXI CARE® NT product that is available from Land O'Lakes, Inc. of Arden Hills, Minn. The calf milk replacer fed to the calves in the Test treatment was a modified form of the MAXI CARE® NT product in which the soy protein component of the MAXI CARE® NT product was replaced with the soy protein product of Sample No. 3 from Example 3, on a pound crude protein per pound crude protein basis. Thus, the principal difference between the calf milk replacer of the Control treatment and the calf milk replacer of the Test treatment was the calf milk replacer of the Test treatment contained a soy protein component that was based on soy protein treated with sodium bisulfite, whereas the calf milk replacer of the Control treatment contained a soy protein component that was not based on treatment of the with any reducing agent, such as sodium bisulfite.

The fluid animal feed that was fed to the calves of the Control treatment and the Test treatment included a rehydrated form (also referred to herein as the fluid milk replacer) of the calf milk replacer used in the particular treatment along with a small amount of an antibiotic blend. The antibiotics used for the calves of the Control and Test treatments consisted of a blend of Neomycin and Oxytetracycline. The antibiotic blend was added in the same concentration to the fluid animal feed that was fed to the calves of the Control treatment and the Test treatment; thereby, each calf the two different treatments received approximately the same daily dosage of each of the antibiotics of the antibiotic blend. For the calves of the Control treatment and the Test treatment, the Neomycin was included in the fluid animal feed at the rate of 250 grams of Neomycin per ton of powdered milk replacer, based on the dry weight of the powdered milk replacer, and the Oxytetracycline was included in the fluid animal feed at the rate of 125 grams of Oxytetracycline per ton of powdered milk replacer, based on the dry weight of the powdered milk replacer.

Details about the diet of the calves during the pre-weaning period and details about the calf milk replacer component of the fluid animal feed for the Control and Test treatments are provided in Table 4 below.

TABLE 4

Diet During Pre-Weaning Period of Example 4

| Treatment Name | Milk Replacer (MR) Description | Number of Calves |
|---|---|---|
| Control | 22:20 MAXI CARE® NT Product[A] | 20 |
| Test | 22:20 MAXI CARE® NT Product[A] (Modification No. 1)[B] | 20 |

[A] The milk replacer was medicated to include the following antibiotics: 250 grams Neomycin & 125 grams Oxytetracycline per ton of milk replacer.
[B] Modification No. 1 consisted of replacing the soy protein component present in the MAXI CARE® NT Product with the soy protein product produced in accordance with the present invention, on a pound crude protein per pound crude protein basis.

The fluid animal feed was individually fed to each of the calves in the Control and Test treatments twice per day at about 7:30 a.m. and again at about 4:00 p.m. Also, the calves of each treatment were, as previously indicated, given continuous and equal access to fresh water. The cows received a sufficient amount of the fluid animal feed of their particular treatment to ensure that at least about ten weight percent, based on the amount of fluid animal feed provided at the beginning of each test period, remained per feeding period for each test cow. Each of the calves of each of the treatments quickly consumed most of their particular allotment of the fluid animal feed within a few minutes of being provided with the fluid animal feed. Any leftover rations from the previous feeding of the fluid animal feed were collected and weighed from each animal's individual feeding trough prior to feeding the test cattle the next feeding period.

The calf milk replacer originated as powdered milk replacer that was rehydrated to form the fluid milk replacer that was fed to the calves. The calf milk replacer was rehydrated with water to form rehydrated milk replacer (fluid milk replacer) having a total solids concentration ranging from about 10 weight percent to about 16 weight percent, based on the total weight of the rehydrated milk replacer, depending upon the particular seven day time period (1, 2, 3, or 4) when the rehydrated milk replacer was provided to the calves. The particular ratios of powdered milk replacer to water and the particular amounts of powdered and fluid milk replacer included in the Control and Test treatments for the four different feeding periods are provided in Table 5 below.

TABLE 5

Milk Replacer Feeding Details (Per Calf) During Pre-Weaning Period of Example 4

| Time Period[A] | Description | Control[C] | Test[C] |
|---|---|---|---|
| Period 1 (Days 1-7) | Weight Percent Milk Replacer Powder In Fluid Milk Replacer[B] | 10.00 | 10.00 |
| | Pounds of Milk Replacer Powder Per Milk Replacer Feeding[B] | 0.60 | 0.60 |
| | Pounds of Water Per Milk Replacer Feeding[B] | 5.4 | 5.4 |
| | Pounds of Fluid Milk Replacer Per Milk Replacer Feeding[B] | 6.0 | 6.0 |
| Period 2 (Days 8-14) | Weight Percent Milk Replacer Powder In Fluid Milk Replacer[B] | 12.10 | 12.10 |
| | Pounds of Milk Replacer Powder Per Milk Replacer Feeding[B] | 0.8 | 0.8 |
| | Pounds of Water Per Milk Replacer Feeding[B] | 5.8 | 5.8 |
| | Pounds of Fluid Milk Replacer Per Milk Replacer Feeding[B] | 6.6 | 6.6 |
| Period 3 (Days 15-21) | Weight Percent Milk Replacer Powder In Fluid Milk Replacer[B] | 14.08 | 14.08 |
| | Pounds of Milk Replacer Powder Per Milk Replacer Feeding[B] | 1.00 | 1.00 |
| | Pounds of Water Per Milk Replacer Feeding[B] | 6.1 | 6.1 |
| | Pounds of Fluid Milk Replacer Per Milk Replacer Feeding[B] | 7.1 | 7.1 |
| Period 4 (Days 21-28) | Weight Percent Milk Replacer Powder In Fluid Milk Replacer[B] | 16.00 | 16.00 |
| | Pounds of Milk Replacer Powder Per Milk Replacer Feeding[B] | 1.20 | 1.20 |
| | Pounds of Water Per Milk Replacer Feeding[B] | 6.3 | 6.3 |
| | Pounds of Fluid Milk Replacer Per Milk Replacer Feeding[B] | 7.5 | 7.5 |
| Total Pounds of Milk Replacer Powder Fed During Periods 1-7 (on a Dry Matter Basis) | | 50.4 | 50.4 |

[A]Each period had a seven day duration.
[B]Two daily feedings of milk replacer for the Control treatment and the Test treatment from Period 1 thru Period 4.
[C]Based on the total weight of the Fluid Milk Replacer Next, details about the average weight gain per calf during the four individual week-long periods of the pre-weaning feeding trial along with an average total weight gain per calf over the four weeks of the pre-weaning feeding trial are provided in Table 6 below.

TABLE 6

Weight Gain During Pre-Weaning Period of Example 4

| | Control | Test | Coefficient of Variation (C.V.) |
|---|---|---|---|
| Average Gain Per Calf During Period 1[A] (lbs) | −3.14 | −1.54 | −149.05 |
| Average Gain Per Calf During Period 2[A] (lbs) | 1.21 | 1.66 | 405.61 |
| Average Gain Per Calf During Period 3[A] (lbs) | 8.19 | 8.26 | 31.77 |
| Average Gain Per Calf During Period 4[A] (lbs) | 9.24 | 8.71 | 40.72 |
| Average Total Gain Per Calf From Period 1 Through Period 4 (lbs) | 15.49 | 17.08 | 48.30 |

[A]Each period had a seven day duration.

The data presented in Table 6 show an increase in average total weight gain per calf during the pre-weaning feeding trial for the calves of the Test treatment versus the calves of the Control treatment. Thus, from the data of Table 6, one may conclude that inclusion of the soy protein product produced in accordance with the present invention in the Control treatment is at least as effective as feeding the prior art soy protein component employed in the Control treatment for purposes of maintaining calf weight gain during the pre-weaning feeding trial. In fact, from the data of Table 6, inclusion of the soy protein product produced in accordance with the present invention appears to beneficially increase calf weight gain during the pre-weaning feeding trial versus inclusion of the prior art soy protein component employed in the Control treatment.

Next, details about the average milk replacer consumption per calf over the four individual week-long periods of the pre-weaning feeding trial and over the entire pre-weaning feeding trial are provided in Table 7 below.

TABLE 7

Milk Replacer Consumption During Pre-Weaning Period of Example 4

| | Control | Test | Coefficient of Variation (C.V.) |
|---|---|---|---|
| Average Milk Replacer Consumption[A] Per Calf During Period 1[B] (lbs) | 7.49 | 7.35 | 14.98 |
| Average Milk Replacer Consumption[A] Per Calf During Period 2[B] (lbs) | 9.65 | 9.84 | 16.73 |
| Average Milk Replacer Consumption[A] Per Calf During Period 3[B] (lbs) | 13.34 | 13.38 | 8.84 |
| Average Milk Replacer Consumption[A] Per Calf During Period 4[B] (lbs) | 16.39 | 15.70 | 11.86 |
| Average Total Milk Replacer Consumption[A] Per Calf During Period 1 Through Period 4 (lbs) | 46.88 | 46.27 | 10.18 |

[A]Milk Replacer Consumption Weight is provided on a dry matter (dm) basis
[B]Each period had a seven day duration.

The data presented in Table 7 shows the differences between feeding regimens in the Control treatment and the Test treatment caused virtually no change in the average total milk replacer (dry weight) consumption per calf during the pre-weaning feeding trial for the calves of the Test treatment versus the calves of the Control treatment. Thus, from the data of Table 7, one may conclude that inclusion of the soy protein product produced in accordance with the present invention is at least as effective as feeding the prior art soy protein component employed in the Control treatment, at least with regard to maintaining calf milk replacer consumption during the pre-weaning feeding trial.

Next, weight, weight gain, and feed efficiency details during the pre-weaning trial are provided in Table 8 below:

TABLE 8

Feed Efficiency During Pre-Weaning Period of Example 4

| | Control | Test | Coefficient of Variation (C.V.) |
|---|---|---|---|
| Number of Calves Present in Trial At End of Period 4 | 17 | 17 | |
| Average Initial Ig$^A$ For All Calves | 2.21 | 2.12 | 52.27 |
| Average Initial Weight Per Calf, lbs. (at start of period 1) | 99.38 | 99.31 | 3.52 |
| Average Ending Weight Per Calf, lbs. (at end of period 4) | 114.87 | 116.39 | |
| Average Total Gain Per Calf From Period 1 Through Period 4 (lbs) | 15.49 | 17.08 | 48.30 |
| Feed Efficiency Average$^B$ During Periods 1-4 | 0.33 | 0.37 | −3288.42 |

$^A$Expressed in weight percent, as measured by Zinc Sulfate Turbidity test, then assigned to level 1, level 2, level 3, level 4, or level 5 as follows: (1) Ig = 0.00-0.49, (2) Ig = 0.50-0.99, (3) Ig = 1.00-1.49, (4) Ig = 1.50-2.49, (5) Ig = 2.5 and higher.
$^B$The Feed Efficiency Average is the ratio of the average total weight gained per calf from period 1 through period 4 versus the average total milk replacer consumption per calf from period 1 through period 4.

The data presented in Table 8 shows the feeding regimen differences between the Test treatment and the Control treatment substantially increased the Feed Efficiency Average during the pre-weaning feeding trial for the calves of the Test treatment versus the calves of the Control treatment. Thus, from the data of Table 8, one may conclude that inclusion of the soy protein product produced in accordance with the present invention more effective than feeding the prior art soy protein component employed in the Control treatment for purposes of enhancing the Feed Efficiency Average during the pre-weaning feeding trial.

Next, details about average calf scour scores over the four-week feeding trial are provided for the Control and Test treatments in Table 9 below:

TABLE 9

Average Calf Scour Scores Per Calf During 4-Week Feeding Trial

| Average Calf$^B$ Scour Score$^A$ | Control | Test | Coefficient of Variation (C.V.) |
|---|---|---|---|
| Period 1$^C$ | 1.49 | 1.49 | 24.28 |
| Period 2$^C$ | 1.56 | 1.53 | 26.03 |
| Period 3$^C$ | 1.05 | 1.05 | 13.68 |
| Period 4$^C$ | 1.04 | 1.08 | 13.06 |
| Average$^D$ Calf Scour Score$^A$ for Periods 1-2 | 1.53 | 1.51 | 19.57 |
| Average$^D$ Calf Scour Score$^A$ for Periods 1-4 | 1.29 | 1.29 | 14.36 |

$^A$Scour Scores are rated on a scale of 1 to 4, for each individual calf, based upon the appearance of the calve = s feces: Scour Score = 1 for a normal feces Scour Score = 2 for loose feces Scour Score = 3 for feces exhibiting separated water Scour Score = 4 for diarrhea indicative of sever calf dehydration
$^B$The Average Scour Score per calf for an individual period was determined by first assigning a scour score to each calf on each day of the period and then collectively averaging all daily scour scores assigned for each of the calf.
$^C$Each period had a seven day duration.
$^D$The Average Scour Score per calf over a range of two or more periods was determined by averaging the Average Scour Scores per calf that were previously determined for each of the individual periods included in the range.

The data presented in Table 9 shows the feeding regimen differences between the Test treatment and the Control treatment caused essentially no change of the average calf scour scores during the pre-weaning feeding trial for the calves of the Test treatment versus the calves of the Control treatment. Thus, from the data of Table 9, one may further conclude that inclusion of the soy protein product produced in accordance with the present invention is at least as effective as the prior art soy protein component employed in the Control treatment, at least for purposes of minimizing scours in calves during the pre-weaning feeding trial.

Next, details about the average calf scour days over the four-week feeding trial are provided for the two different treatments in Table 10 below:

TABLE 10

Average Calf Scour Days During 4-Week Feeding Trial

| Average Calf Scour$^A$ Days$^B$ | Control | Test | Coefficient of Variation (C.V.) |
|---|---|---|---|
| Period 1$^C$ | 2.88 | 2.94 | 64.40 |
| Period 2$^C$ | 3.41 | 3.41 | 77.79 |
| Period 3$^C$ | 0.35 | 0.35 | 200.67 |
| Period 4$^C$ | 0.29 | 0.59 | 324.22 |
| Average$^D$ Calf Scour$^A$ Days$^B$ for Periods 1-2 | 6.29 | 6.35 | 57.67 |
| Average$^D$ Calf Scour$^A$ Days$^B$ for Periods 1-4 | 6.94 | 7.29 | 65.72 |

$^A$Scour Scores are rated on a scale of 1 to 4, for each individual calf, based upon the appearance of the calve = s feces: Scour Score = 1 for a normal feces Scour Score = 2 for loose feces Scour Score = 3 for feces exhibiting separated water Scour Score = 4 for diarrhea indicative of sever calf dehydration
$^B$The Average Calf Scour Days for an individual period was determined by (a) first recording, by calf, how many days during the period the calf had a Scour Score of 2 or more to arrive at each calve = s individual Scour Day measure for the period and then (b) collectively averaging all individual Scour Day measures of each calf determined in (a) during the period.
$^C$Each period had a seven day duration.
$^D$The Total Average Scour Days over a range of two or more periods was determined by totaling each of the Average Calf Scour Days for each of the individual periods included in the range.

The data presented in Table 10 shows the difference feeding regimens of the Control and Test treatments did not cause any significant change in the average number of calf scour days during the pre-weaning feeding trial for the calves of the Test treatment versus the calves of the Control treatment. Thus, from the data of Table 10, one may conclude that inclusion of the soy protein product produced in accordance with the present invention is at least as effective as the prior art soy protein component employed in the Control treatment and in the Test treatment, at least in relation to minimizing scours in calves during the pre-weaning feeding trial.

Next, details about the average calf respiratory score over the four-week feeding trial are provided for the Control and Test treatments in Table 11 below:

TABLE 11

Average Calf Respiratory Score During 4-Week Feeding Trial

| Average[B] Calf Respiratory Score[A] During: | Control | Test | Coefficient of Variation (C.V.) |
|---|---|---|---|
| Period 1[C] | 0.24 | 0.29 | 372.23 |
| Period 2[C] | 0.65 | 0.65 | 232.78 |
| Period 3[C] | 1.12 | 1.41 | 167.82 |
| Period 4[C] | 0.41 | 1.00 | 151.30 |
| Total[D] Average Calf Respiratory Score For Periods 1-4 | 2.41 | 3.35 | 101.50 |

[A] A Respiratory Score of either 0 or 1 is assigned to each calf each day. A Respiratory Score of 1 is assigned on a particular day if the calf is given antibiotics for treatment of a respiratory infection, and a Respiratory Score of 0 is assigned on a particular day if the calf is not given antibiotics for treatment of a respiratory infection.

[B] The Average Calf Respiratory Score for an individual period was determined by (a) first recording each calves Respiratory Score for each day of the period; (b) then, for each calf individually averaging the total of all Respiratory Scores for all days in the period; and then (c) collectively averaging the individual Respiratory Score Averages determined in (b) of all of the calves.

[C] Each period had a seven day duration.

[D] The Total Average Calf Respiratory Score over a range of two or more periods was determined by totaling each of the Average Calf Respiratory Scores for each of the individual periods included in the range.

The data presented in Table 11 illustrates that differences between the feeding regimens of the Test treatment and the Control treatment did not cause any significant change in the incidence of respiratory ailments over the entire four week pre-weaning feeding trial for the calves of the Test treatment versus the calves of the Control treatment. Thus, from the data of Table 11, one may conclude that inclusion of the soy protein product produced in accordance with the present invention is at least as effective as feeding the prior art soy protein component employed in the Control treatment, at least with regard to minimizing respiratory ailments in calves during the pre-weaning feeding trial.

Next, details about the average electrolyte and antibiotic costs for treatment of scours and respiratory ailments occurring over the four-week feeding trial are provided in Table 12 below for calves subjected to the Control and Test treatments:

TABLE 12

Average Electrolyte and Antibiotic Costs During 4-Week Feeding Trial

| Period[B] | Variable[A] | Control | Test | Coefficient of Variation (C.V.) |
|---|---|---|---|---|
| 1 | Average Electrolyte Cost for Period | $2.28 | $2.20 | 79.01 |
|   | Average Antibiotic Cost for Period | $0.84 | $0.60 | 240.12 |
|   | Average Electrolyte & Antibiotic Cost for Period | $3.12 | $2.80 | 94.57 |
| 2 | Average Electrolyte Cost for Period | $3.09 | $3.06 | 72.59 |
|   | Average Antibiotic Cost for Period | $1.32 | $1.08 | 191.93 |
|   | Average Electrolyte & Antibiotic Cost for Period | $4.40 | $4.14 | 80.24 |
| 3 | Average Electrolyte Cost for Period | $0.62 | $0.46 | 184.48 |
|   | Average Antibiotic Cost for Period | $1.92 | $1.46 | 164.95 |
|   | Average Electrolyte & Antibiotic Cost for Period | $2.54 | $1.92 | 132.92 |
| 4 | Average Electrolyte Cost for Period | $0.32 | $0.40 | 307.18 |
|   | Average Antibiotic Cost for Period | $0.76 | $1.09 | 153.86 |
|   | Average Electrolyte & Antibiotic Cost for Period | $0.99 | $1.49 | 143.44 |
|   | Total of Average Electrolyte Costs for Periods 1-4 | $6.21 | $6.12 | 63.68 |
|   | Total of Average Antibiotic Cost for Periods 1-4 | $4.84 | $4.23 | 98.24 |
|   | Total of Average Electrolyte & Antibiotic Cost for Periods 1-4 | $11.05 | $10.35 | 62.86 |

[A] All Variables (Average Electrolyte Cost for Period, Average Antibiotic Cost for Period, Average Electrolyte & Antibiotic Cost for Period, Total of Average Electrolyte Costs for Periods 1-4, Total of Average Antibiotic Cost for Periods 1-4, and Total of Average Electrolyte & Antibiotic Cost for Periods 1-4) are on a per calf basis.

[B] Each period had a seven day duration.

The data presented in Table 12 shows the difference in feeding regiment between the Test treatment and the Control treatment did not cause any significant change in the average (per calf) cost of electrolytes and antibiotics during the pre-weaning feeding trial. Thus, from the data of Table 12, one may conclude that inclusion of the soy protein product produced in accordance with the present invention is at least as effective as the prior art soy protein component employed in the Control treatment, at least in regard to minimizing the expense of electrolyte and antibiotic treatment of calves during the pre-weaning feeding trial.

Values for parameters presented in this example exclude data obtained for certain calves, despite the fact though those calves were present at the start of the period when the data was obtained or based. This phenomena merely recognizes there is virtually always some degree of mortality and health issues in young calves, whether those calves are involved in testing of different feeding regimens or are merely being fed outside of an experimental test regimen. Typically, mortality rates for calves generally range from about five percent up to about twenty percent, during shorter-length testing programs, such as in the four week long pre-weaning feeding trial of this example.

In addition to accounting for calf mortality, data for a particular calf that was determined to be outside two standard deviations from the mean value (for the calves as a group in a particular treatment) of a particular parameter were excluded from the data set for that particular treatment even though that particular calf was alive throughout the particular treatment. Treatment of such data outside two standard deviations in this fashion helps account for calf health issues unrelated to the testing program and is a standard practice at this and other animal research facilities. Typically, data from less than five percent of calves are removed from the data set in this fashion in a particular treatment trial due to parameter data for a particular calf being outside two standard deviations from the mean value.

Although the present invention has been described with reference to preferred embodiments, workers skilled in the art will recognize that changes may be made in form and detail without departing from the spirit and scope of the invention.

The invention claimed is:

1. A method of processing a proteinaceous material the method comprising:
    blending the proteinaceous material with alcohol and a reducing agent to form a mixture wherein the percentage of alcohol in the mixture is in the range of between about 5 to about 20 percent by weight;
    maintaining the mixture at a temperature greater than 90° C. and a pressure greater than 10 psig for a holding period at least about five minutes to form a proteinaceous product; and
    removing all or essentially all of the alcohol by venting the pressure on the proteinaceous product, the proteinaceous product with enhanced solubility and preserved color characteristics.

2. The method of claim 1 wherein, the alcohol is present in the mixture during the holding period.

3. The method of claim wherein the proteinaceous material comprises oilseed material that comprises oilseed protein.

4. The method of claim 3 wherein the oilseed material comprises soy protein.

5. The method of claim 1 wherein the reducing agent comprises a source of $SO_2$.

6. The method of claim 1 wherein the reducing agent comprises an alkali metal sulfite, an alkali metal bisulfite, an alkali metal meta bisulfite, an alkali metal pyrosulfite, or any mixture of any of these.

7. The method of claim 1 wherein the reducing agent comprises sulfur dioxide, sodium sulfite, sodium bisulfite, sodium meta bisulfite, sodium pyrosulfite, potassium sulfite, potassium bisulfite, potassium meta bisulfite, potassium pyrosulfite, or any mixture of any of these.

8. The method of claim 1 wherein the alcohol is infinitely miscible in water.

9. The method of claim 1 wherein the alcohol comprises methanol, ethanol, propanol, or any mixture of any of these.

10. The method of claim 1 wherein the temperature ranges from about 100° C. to about 121° C.

11. The method of claim 1 wherein the holding period is at least about ten minutes.

12. The method of claim 11 wherein the holding period ranges from about ten to about thirty minutes.

13. The method of claim 1, the method further comprising maintaining the combination comprising the proteinaceous material and the reducing agent at super-atmospheric pressure during the holding period.

14. The method of claim 13 wherein the super-atmospheric pressure ranges from about ten pounds per square inch gauge to about thirty pounds per square inch gauge.

15. A method of forming an animal feed, the method comprising combining the proteinaceous product of claim 1 with an animal feed component.

16. A method of processing a proteinaceous material the method comprising:
    blending the proteinaceous material with a reducing agent to form a mixture;
    maintaining the mixture at a temperature greater than 90° C. and a pressure greater than 10 psig in an autoclave for a holding period to form a proteinaceous product; and
    removing all or substantially all of any alcohol present in the proteinaceous product by venting the pressure on the proteinaceous product, the proteinaceous product having enhanced solubility and preserved color characteristics.

17. The method of claim 16 wherein the proteinaceous material comprises oilseed material that comprises oilseed protein.

18. The method of claim 17 wherein the oilseed material comprises soy protein.

19. The method of claim 16 wherein the reducing agent comprises a source of $SO_2$.

20. The method of claim 16 wherein the reducing agent comprises an alkali metal sulfite, an alkali metal bisulfite, an alkali metal meta bisulfite, an alkali metal pyrosulfite, or any mixture of any of these.

21. The method of claim 16 wherein the reducing agent comprises sulfur dioxide, sodium sulfite, sodium bisulfite, sodium meta bisulfite, sodium pyrosulfite, potassium
    sulfite, potassium bisulfite, potassium meta bisulfite, potassium pyrosulfite, or any mixture of any of these.

22. The method of claim 16 wherein the greater than ambient temperature ranges from about 100° C. to about 121° C.

23. The method of claim 16 wherein the holding period lasts at least about five minutes.

24. The method of claim 16 wherein the holding period lasts at least about ten minutes.

25. The method of claim 16 wherein the holding period ranges from about ten minutes to about thirty minutes.

26. The method of claim 16 wherein the mixture further comprises an alcohol.

27. The method of claim 26 wherein the alcohol is infinitely miscible in water.

28. The method of claim 26 wherein the alcohol comprises methanol, ethanol, propanol, or any mixture of any of these.

29. A method of forming an animal feed, the method comprising combining the proteinaceous product of claim 16 with an animal feed component.

30. The method of claim 29 wherein the mixture of claim 20 further comprises alcohol and the method further comprises removing all or essentially all of any incorporated alcohol from the proteinaceous product.

31. The method of claim 1 wherein the mixture further comprises water.

32. The method of claim 1 wherein the proteinaceous material and reducing agent are combined with an aqueous solution to form the mixture, the aqueous solution comprising the alcohol and water.

33. The method of claim 16 wherein the mixture further comprises water.

\* \* \* \* \*

UNITED STATES PATENT AND TRADEMARK OFFICE
CERTIFICATE OF CORRECTION

| | | |
|---|---|---|
| PATENT NO. | : 7,608,292 B2 | Page 1 of 1 |
| APPLICATION NO. | : 10/684748 | |
| DATED | : October 27, 2009 | |
| INVENTOR(S) | : Bill L. Miller et al. | |

It is certified that error appears in the above-identified patent and that said Letters Patent is hereby corrected as shown below:

Claim 3

Col. 29, line 62, after "claim", insert --1--.

Claim 30 (Original claim 34)

Col. 31, line 9, change "20" to --16--.

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

PATENT NO.       : 7,608,292 B2  Page 1 of 1
APPLICATION NO.  : 10/684748
DATED            : October 27, 2009
INVENTOR(S)      : Miller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1167 days.

Signed and Sealed this

Twelfth Day of October, 2010

David J. Kappos
*Director of the United States Patent and Trademark Office*